United States Patent
Ohmori et al.

(10) Patent No.: US 6,444,994 B1
(45) Date of Patent: Sep. 3, 2002

(54) APPARATUS AND METHOD FOR PROCESSING THE COMPONENTS OF A NEUTRON LENS

(75) Inventors: Hitoshi Ohmori, 3-14-13, Tokiwadai, Itabashi-ku, Tokyo 174-0071 (JP); Yutaka Yamagata, Wako (JP); Shinya Morita, Tokyo (JP); Sei Moriyasu, Tokyo (JP); Hirohiko Shimizu, Wako (JP)

(73) Assignees: Riken, Saitama (JP); Hitoshi Ohmori, Tokyo (JP)

( * ) Notice: Subject to any disclaimer, the term of this patent is extended or adjusted under 35 U.S.C. 154(b) by 50 days.

(21) Appl. No.: 09/651,278

(22) Filed: Aug. 30, 2000

(30) Foreign Application Priority Data

Aug. 30, 1999 (JP) .......................................... 11-242523

(51) Int. Cl.$^7$ ............................. H01J 5/18; G21K 5/00; G21K 1/06; G02B 6/26; B24B 1/00
(52) U.S. Cl. ...................... 250/505.1; 378/34; 378/84; 378/145; 451/56; 385/31; 250/251
(58) Field of Search ............................. 250/505.1, 251; 378/34, 84; 451/56; 385/31

(56) References Cited

U.S. PATENT DOCUMENTS 5,016,267 A * 5/1991 Wilkins ........................ 378/84
5,999,670 A * 12/1999 Yoshimura et al. ............ 385/31
6,224,469 B1 * 5/2001 Ohmori et al. ................ 451/56

FOREIGN PATENT DOCUMENTS

JP  11-239956  * 7/1999  ............. B24B/7/17

* cited by examiner

Primary Examiner—Jack Berman
Assistant Examiner—Kalimah Fernandez
(74) Attorney, Agent, or Firm—Griffin & Szipl, P.C.

(57) ABSTRACT

A rotating table 2 that holds a flat neutron lens component 1 and rotates about an axis of rotation Z, a circular-disk type of metal-bonded grinding wheel 3 with tapering surface 3a on the outer periphery thereof, a grinding wheel driving device 4 drives and rotates the grinding wheel around the axis A thereof, an electrode 5 with a surface close to the single tapering surface or the plurality of tapering surfaces of the grinding wheel, a power source 6 that applies an electrolytic voltage between the grinding wheel and the electrode, and a grinding fluid feeder 8 that supplies a conducting grinding fluid between the grinding wheel and the electrode are provided. The angle of the tapering surface 3a of the grinding wheel is formed to be more acute than the angle of a V-shaped groove to be formed on the surface of the neutron lens component, the axis of the grinding wheel is positioned at an oblique angle to the axis of rotation of the neutron lens component by the grinding wheel driving device 4, and the angle of obliqueness θ can be slightly varied at that location. Thus, fine ring-shaped protrusions can be formed accurately with an excellent surface finish and a low processing force, on the surface of a neutron lens component made of graphite etc.

3 Claims, 6 Drawing Sheets

APPARATUS AND METHOD FOR PROCESSING THE COMPONENTS OF A NEUTRON LENS

BACKGROUND OF THE INVENTION

1. Technical Field of the Invention

The present invention relates to an apparatus and method for processing the components that constitute a neutron lens for converging or diverging a neutron beam.

2. Prior Art

A neutron beam has the following features which are different from an X-ray or a photon, (1) strong mutual reaction with atomic nuclei, (2) similar energy and wavelength thereof to those of motions or structures at the atomic level, (3) retention of a magnetic moment, (4) intense penetrating power, etc. Therefore, when the position of an atomic nucleus is to be studied, for instance, to have information about the position of a hydrogen atom in an organic material, which is very difficult to measure by an X-ray diffraction method, a diffraction experiment using a neutron beam is indispensable. In addition, because the spin of a neutron is ½ with a magnetic moment, the magnetic structure of a substance can be investigated conveniently. Furthermore, when the interior of a large object such as an industrial product is to be studied using radio active rays, because a neutron beam has a high penetrating power, fluoroscopy can be used.

However, because neutron beams cannot be generated easily, the sites are limited to nuclear reactors, accelerator facilities, etc. Consequently, a neutron beam must be guided efficiently from the neutron source to the application device in order to irradiate a small sample with a high-density neutron beam. For this purpose, it is essential to have a technology such that the neutron beams can be made parallel and then to make the beams converge sharply.

Recently, the aforementioned technique using neutron beams has been attracting wide attention for analysis etc., and the same applicant as for the present invention has proposed an element for converging or diverging a neutron beam (Japanese patent application No. 60630/1999, not published). In the following paragraphs, this element is called a "neutron lens."

FIG. 1 shows the principle of refraction of a neutron beam by a substance. Mutual reaction between the neutron and the substance occurs mostly with the atomic nuclei contained in the substance and as a result of this reaction, incident neutrons lose part of their kinetic energy when they enter the substance, and the neutrons are slowed down tangentially and normally to the surface boundary of the substance. Therefore, as shown in FIG. 1, a neutron beam entering obliquely through the boundary surface of the substance is refracted with a refractive index of less than 1. At this time, substances which are known to have a refractive index of less than 1 for a neutral beam include O, C, Be and Fe among those with naturally occurring isotopic concentrations, and deuterium D among separated isotopes.

FIG. 2 shows the principles of a neutron lens. This figure illustrates the condition in which a beam of neutrons (beam 16) is incident to a sheet-like member 11. On the surface of the sheet-like member 11 straight protrusions 12 are formed each of which is composed of a substantially vertical surface 14 and an inclined surface 15. A neutron beam 16 entering the inclined surface 15 of the straight protrusion 12 is refracted with an index smaller than 1 as shown in FIG. 1. However, the angle δ of a single refraction is so small that, for instance, when the sheet-like member is composed of polytetrafluoroethylene (PTFE) with a high neutron transmission rate and the inclined surface 15 of the straight protrusion 12 makes an angle α of 45° to the surface of the sheet-like member 11, the angle of refraction δ of a neutron beam with a wavelength of 14 Å impinging vertically onto the sheet-like member 11 is only 0.14 mrad.

FIG. 3 is an isometric view of a neutron lens capable of converging neutron beams, and FIG. 4 shows the section through the line A—A of the lens. The neutron lens is composed of a main portion 20 and upper and lower ring-shaped outer frames 21, 22 that hold the main portion. The neutron lens is assembled by fastening screws 24 into pins arranged between the two ring-like outer frames 21, 22 hat sandwich the main portion 20.

FIGS. 5A and 5B show the structure of the sheet-like components of the main portion 20. The main portion 20 is constructed by laminating a number of sheet-like components 25 each of which is provided with a hole 32 at the center thereof. The closer the sheet-like component is to the top, the larger is the hole bored in the center, and there is no hole in the center of the bottom sheet-like component. Therefore, the main portion is shaped like an earthenware mortar, that is, the center is a concave cone shape. In the example shown in FIG. 4, there are 33 sheet-like components 25 laminated together. Reference numbers 33a to 33d indicate holes for the pins 23.

In FIGS. 5A and 5B, the sheet-like component 25 is composed of a thin sheet with ring-shaped protrusions 31 which have a triangular shape in section, formed coaxially and continuously in the radial direction. The inclined surface 3A of a ring-shaped protrusion 31 with a triangular shape in section, forms an incident surface inclined to the axis of the incoming neutron beam, and the rings face inwards in coaxial circles, that is, towards the center line of the neutron lens.

Neutron beams, traveling in a direction parallel to the axis of the neutron lens, shown in FIGS. 4, 5A and 5B, enter through the inclined surfaces of the ring-shaped protrusions 31 formed on each sheet-like component, therefore the beams are deflected towards the center line of the neutron lens. Neutron beams entering near the center line are deflected through smaller angles because the beams pass through a relatively small number of ring-shaped protrusions, however, neutron beams entering near the outer periphery are deflected more as the beams penetrate a larger number of ring-shaped protrusions. Consequently, this neutron lens performs a similar function to that of a convex lens in an optical system, and can concentrate the neutron beams into a small area.

If the inclined surfaces 31a of the ring-shaped protrusions 31 are made in outward facing concentric circles in the opposite way to FIGS. 5A and 5B, the neutron lens can function as a concave lens does in an optical system with the same configuration as shown in FIG. 4, thereby neutron beams can be made to diverge.

The sheet-like component 25 should be formed using a substance that has a refractive index of less than 1 for a neutron beam as described above. In the case of elements with naturally occurring isotopic compositions these are substances including the elements O, C, Be and F, and deuterium D in the case of enriched isotopes. Practical materials for these substances are the aforementioned polytetrafluoroethylene (PTFE), graphite, neutron-modified polyethylene wherein the hydrogen is changed to deuterium, etc.

Of these materials, graphite (hereinafter simply called as carbon) is readily available at a rather low cost, therefore, it is required that the above-mentioned sheet-like components should be formed from carbon plates.

However, carbon has the problem that because of its hardness and brittleness, it cannot be machined into the preferred shape by a conventional means of processing, for instance, by cutting, as the edge of the ring-shaped protrusion 31 becomes chipped. Furthermore, a large number of sheet-like components 25 must be stacked together to produce a neutron lens, therefore the thinner the sheet-like components 25, the better it is to make the neutron lens small, that is, it is desirable to make the sheets as thin as about 1 mm. However, a thin carbon sheet suffers from the problem that it is damaged even by the small machining force caused by machining. In addition, to precisely deflect neutron beams, the inclined surfaces 31a of the ring-shaped protrusions 31 should be made very accurately. In addition, to transmit the neutron beams with minimum losses, irregular reflections at the surface must be suppressed so the inclined surfaces 31a must be processed with a superior finish, nearly like a mirror.

SUMMARY OF THE INVENTION

The present invention aims to solve these problems. More explicitly, an object of the present invention is to provide a processing apparatus and method for a neutron lens component that can form fine ring-shaped protrusions accurately with a low processing force and excellent surface finish on the surface of a neutron lens component made of graphite etc.

The apparatus provided by the present invention to machine neutron lens components is composed of a rotating table (2) that supports a flat neutron lens component (1) made of a material with a refractive index of less than 1 for a neutron beam and rotates about an axis Z orthogonal to the surface of the aforementioned component, a metal-bonded grinding wheel (3) shaped like a circular disk with one tapering surface (3a) or a plurality of tapering surfaces (3a) on the outer periphery thereof, a grinding wheel driving device (4) that drives the above-mentioned grinding wheel so as to make it rotate around the axis thereof and moves the grinding wheel relative to the rotating table, an electrode (5) located with a surface close to the aforementioned one or several tapering surfaces of the grinding wheel, a power source (6) for applying an electrolytic voltage between the grinding wheel and the electrode, and a grinding fluid feeder (8) for supplying a conducting grinding fluid between the grinding wheel and the electrode, wherein the angle between the aforementioned one or several tapering surfaces (3a) of the grinding wheel is made smaller than the angle of the V-shaped groove produced on the surface of the neutron lens component (1), the above-mentioned grinding wheel driving device (4) is positioned with the axis of the grinding wheel at an oblique angle to the axis of rotation of the neutron lens component, and the inclination thereof can be varied through a small angle about that position.

According to a preferred embodiment of the present invention, the above-mentioned metal-bonded grinding wheel (3) is a cobalt-based bonded grinding wheel containing ultra-fine grinding grains with a mean grain diameter of 10 $\mu$m or less.

According to the present invention, (A) the flat neutron lens component (1) made of a material with a refractive index of less than 1 for a neutron beam is attracted to and held on the surface of the rotating table (2) and rotated around the axis Z orthogonal to the surface of the component, (B) the circular-disk metal-bonded grinding wheel (3) with one or several tapering surfaces (3a) shaped with an angle more acute than the angle of the V-shaped groove being formed on the surface of the neutron lens component is driven so as to rotate about the axis thereof and the aforementioned grinding wheel is moved relative to the rotating table, (C) the conducting grinding fluid is fed between the electrode (5) the surface of which is close to the aforementioned one or several tapering surfaces of the grinding wheel and the grinding wheel, at the same time an electrolytic voltage is applied to the electrode and the tapering surfaces are dressed electrolytically, and (D) at the same time, the center line of the grinding wheel is positioned at an oblique angle to the rotating shaft of the neutron lens component, and the oblique angle is varied slightly about that position, thereby the preferred V-like groove is ground and processed on the surface of the neutron lens component using both sides of the tapering surface.

In the above-mentioned apparatus and method of the present invention, the angle formed by one tapering surface (3a) or a plurality of tapering surfaces (3a) of the grinding wheel is shaped with a more acute angle than the angle of the V-shaped groove formed on the surface of the neutron lens component (1), therefore by slightly varying with an oscillating movement, the angle at which the axis of the grinding wheel is inclined to the cutting surface of the neutron lens component, a V-shaped groove with a freely selected angle greater than the angle of the tapering surfaces (3a) can be machined on the surface of the neutron lens component using both sides of the tapering surface. In addition, since the axis of the grinding wheel is at an oblique angle to the axis of rotation of the neutron lens component, both surfaces of the V-shaped groove formed on the surface of the neutron lens component can be machined at a freely selected angle (for instance, one side perpendicular to the surface, and the other at about 45°

In addition, because the electrode (5) is provided, the surface of which is located close to the tapering surface of the grinding wheel, and while a conducting grinding fluid is fed between the electrode and the grinding wheel, a voltage is applied to electrolytically dress the tapering surface, therefore, even if a metal-bonded bonded grinding wheel containing ultra-fine grinding grains with a mean grain diameter of 10 $\mu$m or less is used, the grinding, grains can be sharpened and always kept in the optimum sharpened condition, so fine ring-shaped protrusions (V-shaped grooves) can be created accurately with an excellent surface finish and a low machining force.

Other objectives and advantages of the present invention are described below referring to the attached drawings.

DESCRIPTION OF PREFERRED EMBODIMENTS

Figure 1:
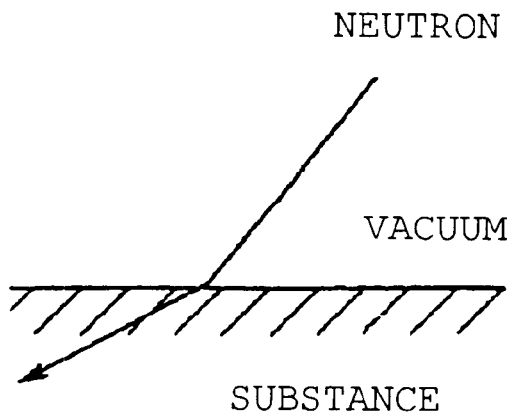
FIG. 1 shows the principles of refraction of a neutron beam in a substance.
Figure 2:
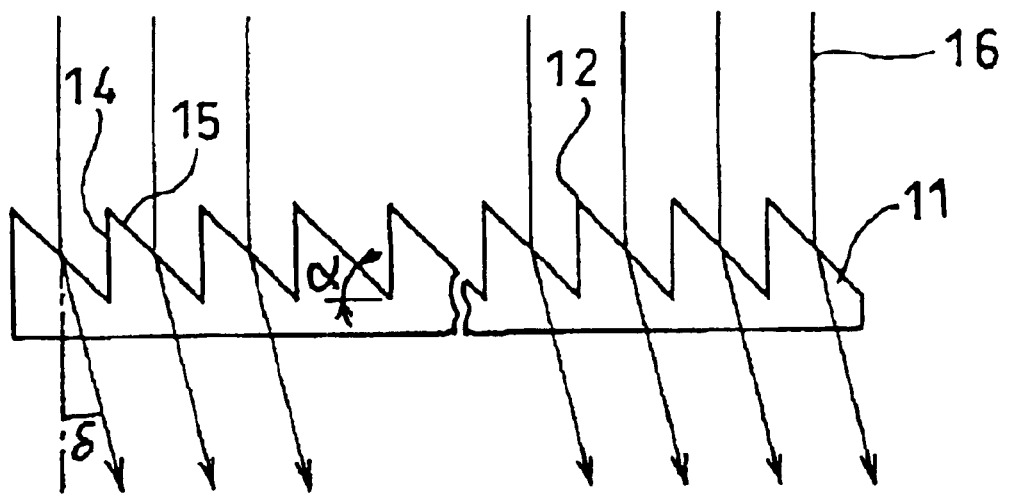
FIG. 2 is a diagram showing the principles of a neutron lens.
Figure 3:
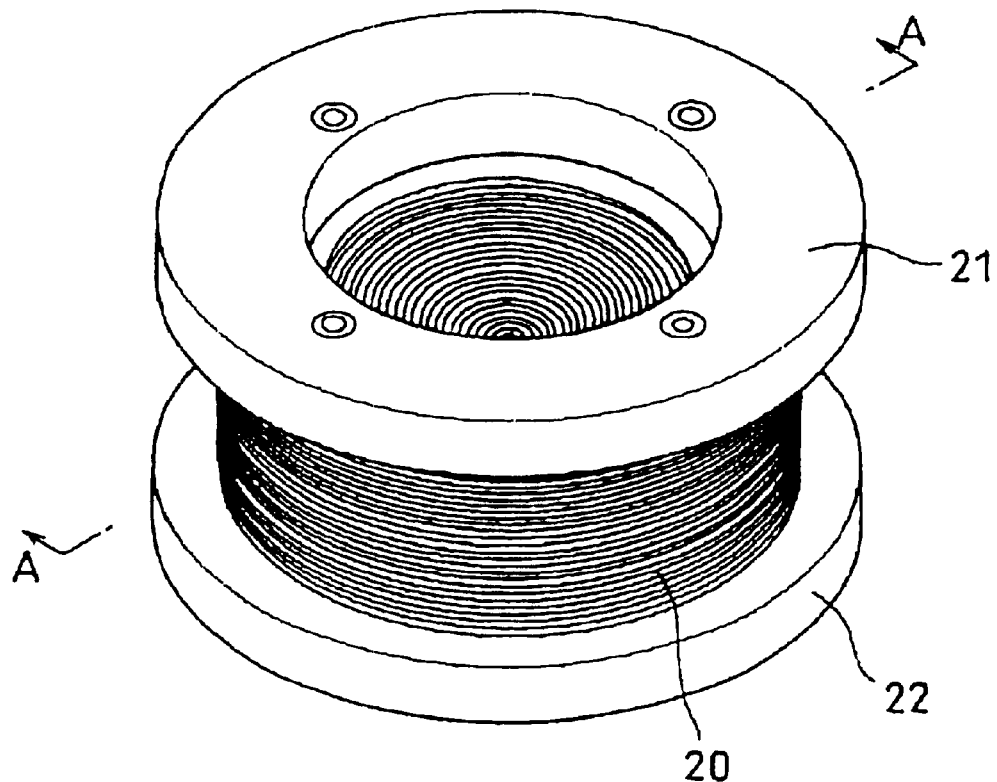
FIG. 3 is an isometric view of a neutron lens that functions to converge a neutron beam.
Figure 4:
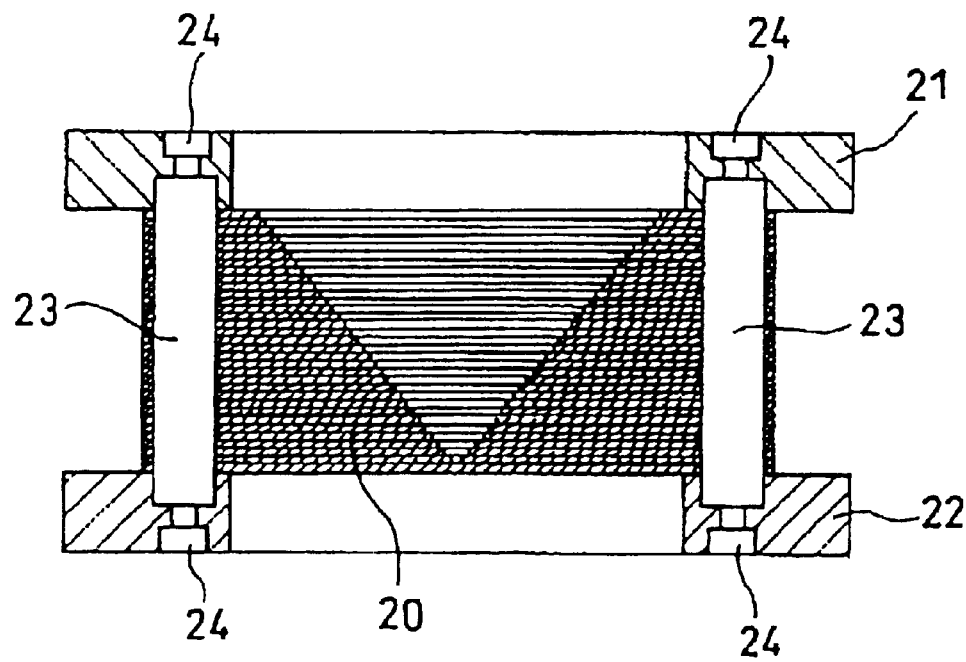
FIG. 4 shows a section through A—A in FIG. 3.
Figure 5A:
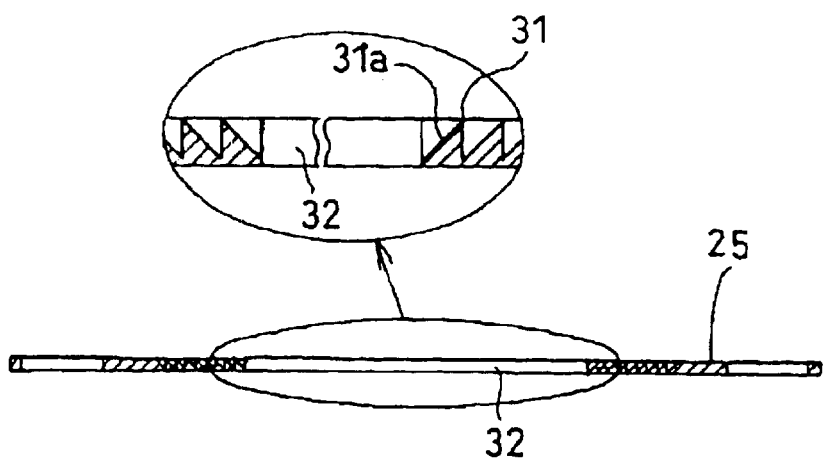
FIGS. 5A and 5B illustrate the structure of a sheet-like component of the main portion shown in FIG. 4.
Figure 5B:
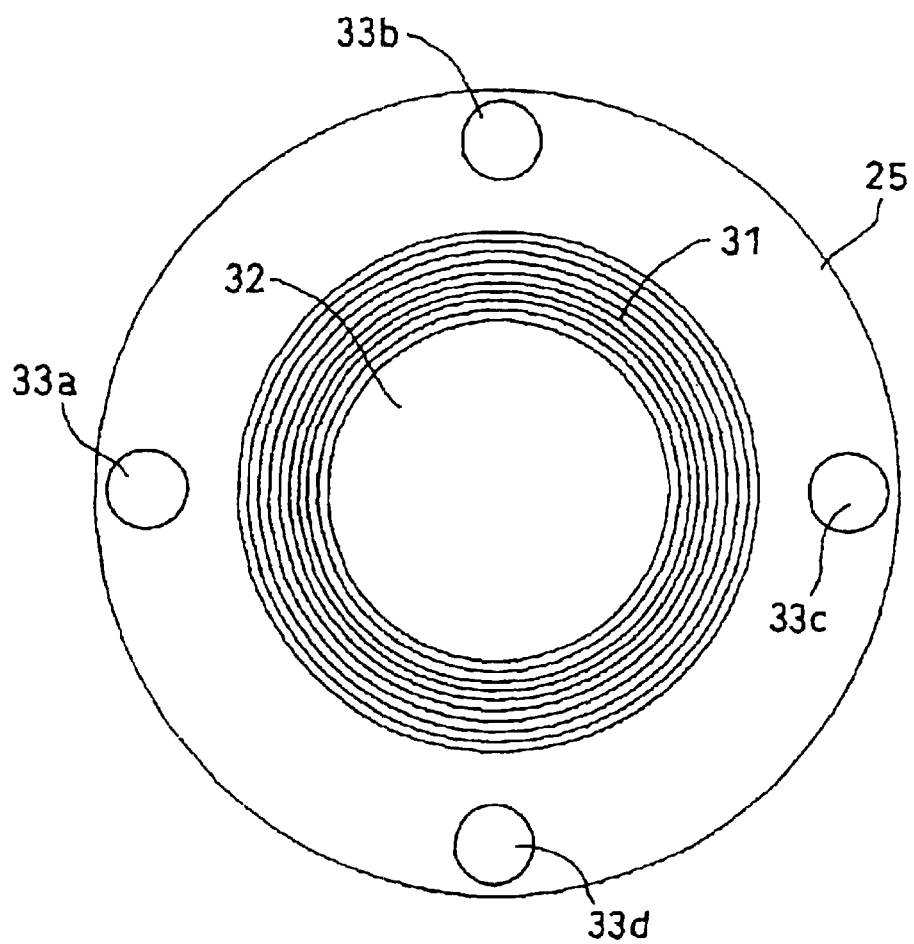

Preferred embodiments of the present invention are described below referring to the drawings. In each drawing, the same parts are identified with the same part numbers and the descriptions are not duplicated.

Figure 6:
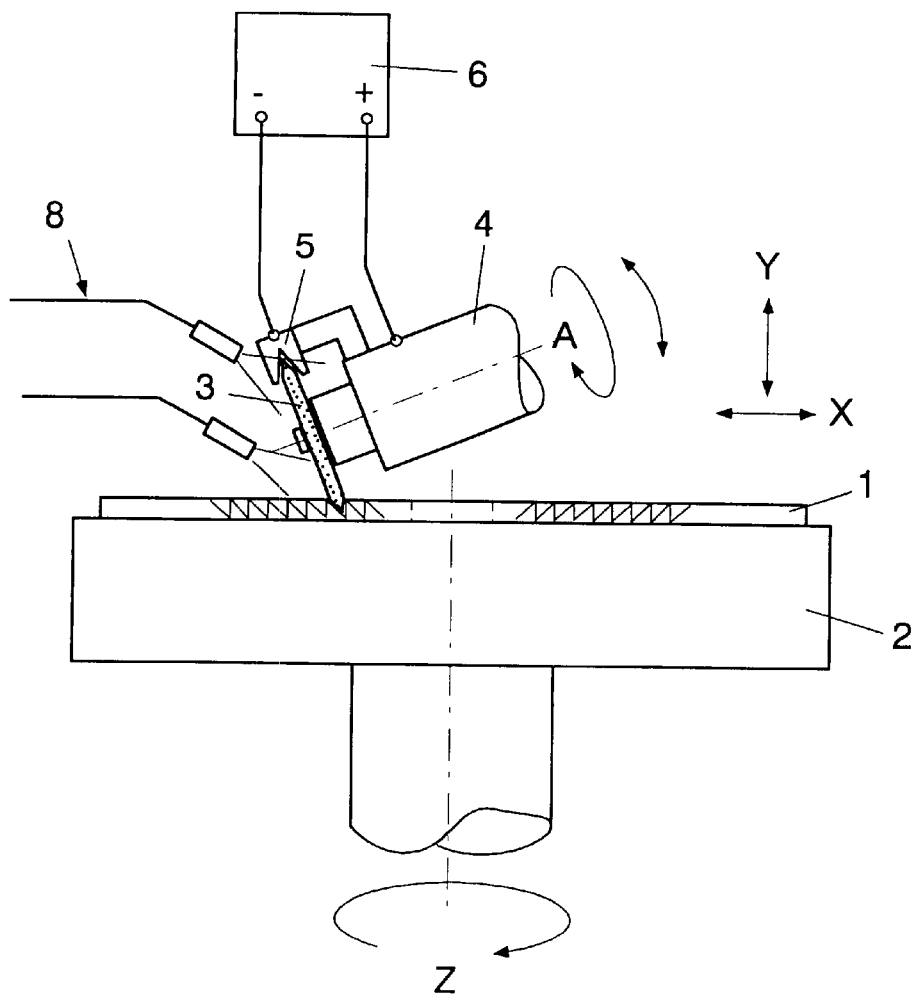
FIG. 6 shows a general configuration of the first embodiment of the neutron lens component processing apparatus according to the present invention.
Figure 7:
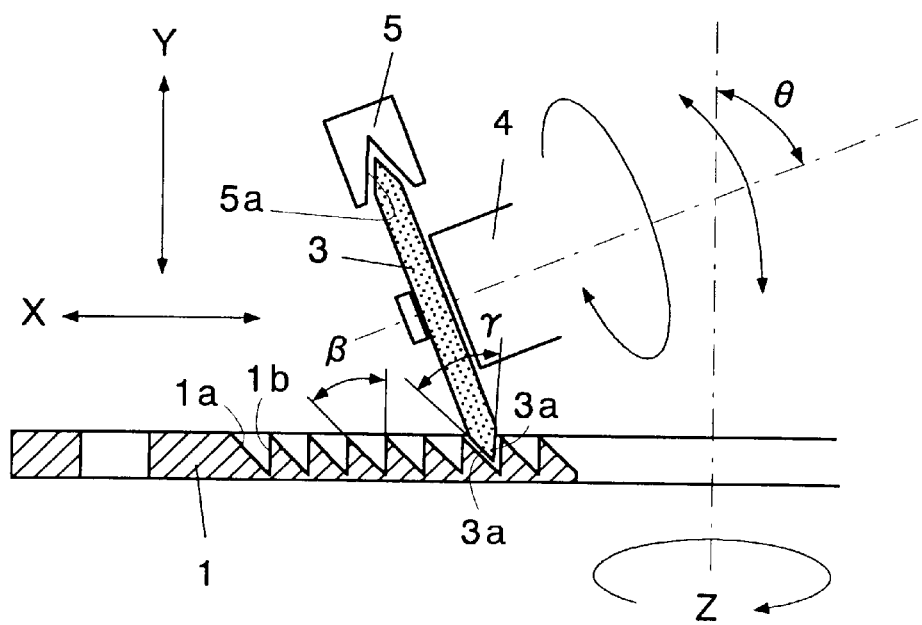
FIG. 7 is an enlarged view of the major portion of the apparatus shown in FIG. 6.

FIG. 6 shows a general configuration of the first embodiment of the neutron lens component processing apparatus according to the present invention, and FIG. 7 is an enlarged view of the major portion in FIG. 6. As shown in FIGS. 6 and 7, the neutron lens component processing apparatus of the present invention is provided with a rotating table 2, a circular-disk-shaped metal-bonded grinding wheel 3, a grinding wheel driving device 4, an electrode 5, a power source 6 and a grinding fluid feeder 8.

The workpiece to be processed by the processing apparatus according to the present invention is a flat neutron lens component 1, and the component is made of a material with a refractive index of less than 1 for a neutron beam. These materials include O, C, Be and F in the case of elements with naturally occurring isotopic compositions, and deuterium D in the case of separated isotopes. In practice, polytetrafluoroethylene (PTFE), graphite, deuterium-modified polyethylene in which the hydrogen is replaced with deuterium, etc. are available.

The rotating table 2 attracts the flat neutron lens component 1 preferably on the surface thereof and firmly holds the component there, and rotates around an axis of rotation Z orthogonal to the surface of the component.

The circular-disk-shaped metal-bonded grinding wheel 3 is provided with, in this example, a tapering surface 3a on its outer periphery. The angle γ made by the tapering surface 3a of the grinding wheel is formed to be sharper than the angle β of the V-shaped grooves produced on the surface of the neutron lens component 1 (for instance, 45°). The metal-bonded grinding wheel 3 is preferred to be a cobalt-based bonded grinding wheel including ultra-fine grinding grains with a mean grain diameter of 10 μm or less.

The grinding wheel driving device 4 rotates the grinding wheel 3 around the axis A thereof, and can move the grinding wheel 3 relative to the rotating table 2 in the left and right directions and in the up and down directions, i.e. in X and Y directions. In addition, this grinding wheel driving device 4 can position the axis A of the grinding wheel 3 at an oblique angle to the axis of rotation Z of the neutron lens component 1 and can slightly vary (tilt) the inclination angle θ about that position.

The electrode 5 is provided with a surface 5a in proximity to the above-mentioned tapering surface 3a of the grinding wheel 3. Furthermore, the power source 6 can apply positive (+) and negative (−) voltages to the grinding wheel 3 and the electrode 5, respectively, and at the same time apply high-frequency voltage pulses appropriate for electrolysis. In addition, the grinding fluid feeder 8 supplies a conducting grinding fluid between the grinding wheel and the electrode 5.

In this configuration, because an electrolytic voltage is applied between the electrode 5 and the grinding wheel 3 while conducting grinding fluid is fed between them, the tapering surface 3a is dressed electrolytically, therefore even if a metal-bonded grinding wheel containing ultra-fine grinding grains with a mean grain diameter of 10 μm or less is used, the grinding grains can be always used in an optimum sharpened condition, so the ring-shaped protrusions (V-shaped grooves) can be accurately formed with a low machining force, to achieve an excellent surface finish.

By using the aforementioned apparatus based on the method of the present invention, the neutron lens component 1 is ground by an electrolytic in-process dressing (ELID) method in the following steps.

(A) A flat neutron lens component 1 is attracted and fixed to the surface of the rotating table 2, and the table is rotated about an axis Z of rotation that is orthogonal to the surface of the component.

(B) Next, the disk-shaped metal-bonded grinding wheel 3 is driven and rotated around its axis A by means of the grinding wheel driving device 4, and the grinding wheel 3 is moved and positioned relative to the rotating table 2.

(C) Next, while the grinding fluid feeder 8 is supplying a conducting grinding fluid between the tapering surface 3a of the grinding wheel 3 and the closely adjacent surface 5a of the electrode 5, the power source 6 applies a voltage for electrolysis between the surface and the electrode, thereby the tapering surface 3a is dressed electrolytically, and (D) At the same time, the axis A of the grinding wheel 3 is positioned at an oblique angle to the axis of rotation Z of the neutron lens component 1, and in that position, the angle of inclination θ is slightly varied by a specified amount, from side to side, while grinding the V-shaped grooves on the surface of the neutron lens component 1 by both sides of the tapering surface 3a.

According to the above-mentioned apparatus and method of the present invention, because the angle γ made by the tapering surface 3a of the grinding wheel 3 is made smaller than the angle β of the V-shaped groove being machined on the surface of the neutron lens component 1, it is possible to machine the V-shaped groove with a freely selected angle β larger than the angle made by the tapering surface 3a, on the surface of the neutron lens component 1, using both sides of the tapering surface 3a by setting the angle of inclination θ of the axis A of the grinding wheel 3 and varying the angle slightly from side to side while cutting the surface of the neutron lens component 1. In addition, since the axis A of the grinding wheel 3 is positioned at an oblique angle to the axis of rotation Z of the neutron lens component, both sides of the V-shaped groove formed on the surface of the neutron lens component 1 can be machined with a freely selected angle β (for example, one angle 1b can be perpendicular to the surface, and the other 1a at about 45°).

Moreover, the electrode 5 is provided with its surface close to the tapering surface of the grinding wheel, and while a conducting grinding fluid is supplied between the electrode 5 and the grinding wheel 3, an electrolytic voltage is applied and the tapering surface 3a is dressed electrolytically, therefore even if a metal-bonded grinding wheel containing ultra-fine grinding grains with a mean grain diameter of 10 μm or less is used, the grinding grains can always be used in the optimum sharpened condition, so fine ring-shaped protrusions (V-shaped grooves) can be formed accurately with an excellent surface finish and a low processing force.

Figure 8:
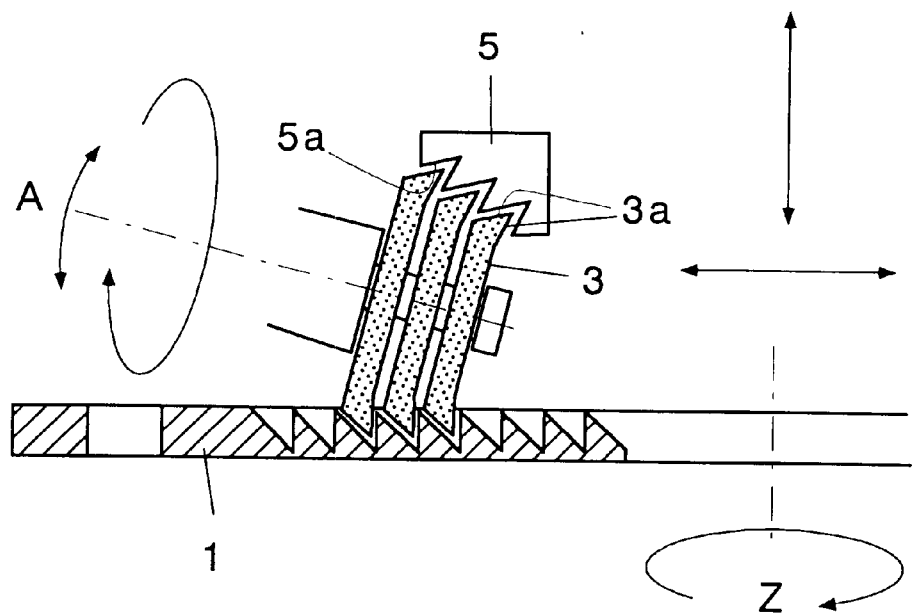
FIG. 8 shows the second embodiment of the present invention.

FIG. 8 shows the second embodiment of the present invention. In this figure, the metal-bonded grinding wheel 3 is composed of three circular-disk shaped grinding wheels provided with three tapering surfaces 3a on the outer peripheries thereof. The electrode 5 is also provided with its surface 5a close to tapering surfaces 3a of the grinding wheel 3. The other details of the configuration are the same as in the first embodiment.

This configuration also allows V-shaped grooves to be cut with a freely selected angle greater than the angle made by the tapering surfaces 3a on the surface of the neutron lens component using both sides of the three tapering surfaces by slightly oscillating the angle of inclination θ of the axis A of the grinding wheel 3 with three tapering surfaces 3a while cutting the surface of the neutron lens component 1. Also, since the axis A of the grinding wheel 3 is positioned at an oblique angle to the axis of rotation of the neutron lens component 1, both sides of the V-shaped groove formed on the surface of the neutron lens component can be machined to a freely selected angle (for instance, one side perpendicular to the surface, and the other at about 45°). In addition, processing productivity can be made about three times higher because three tapering surfaces 3a are used for processing.

Figure 9:
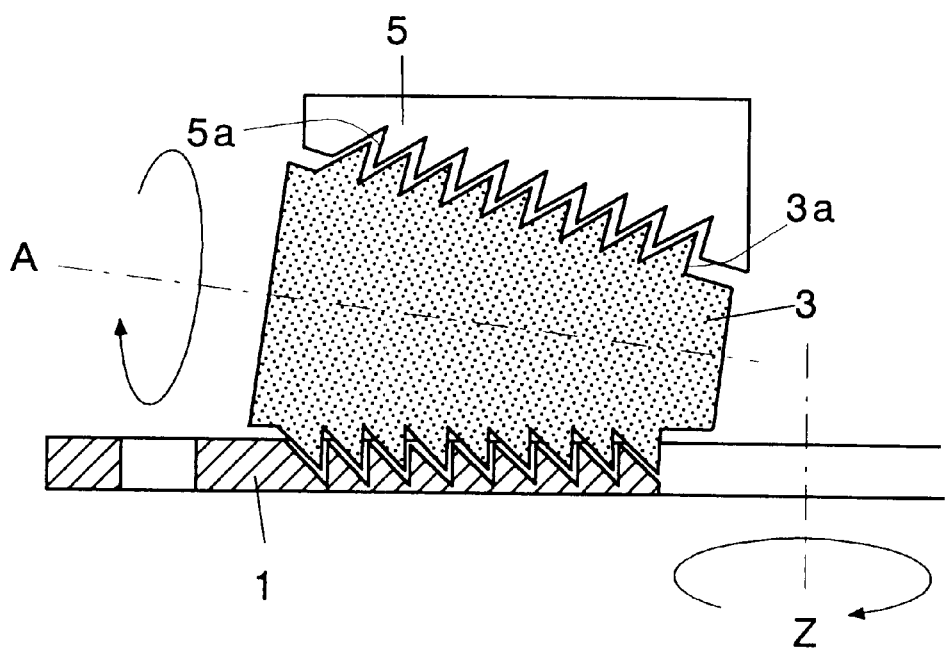
FIG. 9 illustrates the third embodiment of the present invention.

FIG. 9 is a drawing that shows the third embodiment of the present invention. In this figure, the metal-bonded grinding wheel 3 is composed of nine connected circular-disk shaped grinding wheels on the outer peripheries of which there are nine tapering surfaces. The electrode 5 is also provided with surfaces close to the 9 tapering surfaces 3a of the grinding wheel 3.

The grinding wheel 3 in this configuration is a formed grinding wheel; the angle β made by all the tapering surfaces 3a of the grinding wheel 3 are set previously to the angle required for cutting the V-shaped grooves, and the grinding wheel can cut the surface of the neutron lens component 1 without varying the angle of inclination θ of the axis A of the grinding wheel 3. In this way, the processing productivity can be further increased drastically. The other details of the configuration are same as in the first embodiment.

EXPERIMENT

An experiment based on the present invention is described below.

(Methods of Experiment)

To form the aforementioned neutron lens 1, an existing rotating table was used and a carbon (graphite) disk was ground by the ELID method. An NC vertical milling machine was used and configured in the same way as shown in FIG. 6, for experimental purposes. After processing, the processed surfaces and the shape of the grinding wheel were observed and evaluated. Table 1 shows the system used in the experiment.

TABLE 1

Specifications of the system used for the experiment

| | |
|---|---|
| Processing machine | Bed-type NC vertical milling machine: FNC-105 [Makino Milling Machine Co., Ltd.] |
| Grinding wheel | Cobalt-based bonded grinding wheel [Fuji Dies Co., Ltd.] Size: 150 mmφ × 5 mmT × 8 mmX × 45° × 31.75 mmH Grinding grains: Diamond 600 |
| ELID power source | High-frequency pulse generator: ED-910 [Fuji Dies Co., Ltd.] |

TABLE 1-continued

Specifications of the system used for the experiment

| | |
|---|---|
| Grinding fluid | AFG-M (diluted × 50 with tap water) [Noritake Company Limited] |
| Measuring instruments | Contact needle-type surface roughness meter: Surftest 701 [Mitsutoyo Co., Ltd.] Laser autofocus non-contact 3D and 2D measuring system: NH-3 [Mitaka Koki Co., Ltd.] |

(Results of Experiment)

Initial dressing was carried out at 800 rpm which was determined by the capability of the processing machine. The initial RMS current was 2A at 20V, and after about two minutes, the current and voltage were stabilized at 0.2 A and 26V, and the formation of a insulating layer on the surface of the grinding wheel could be confirmed.

Figure 10:
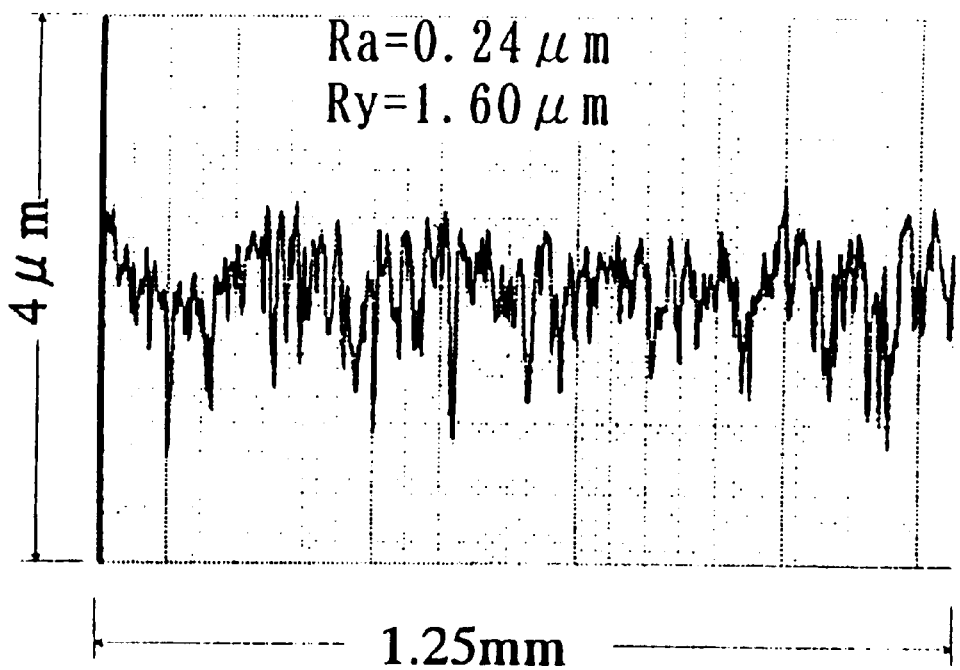
FIG. 10 is a chart showing the roughness of the processed surface of a sample processed according to the present invention.
Figure 11:
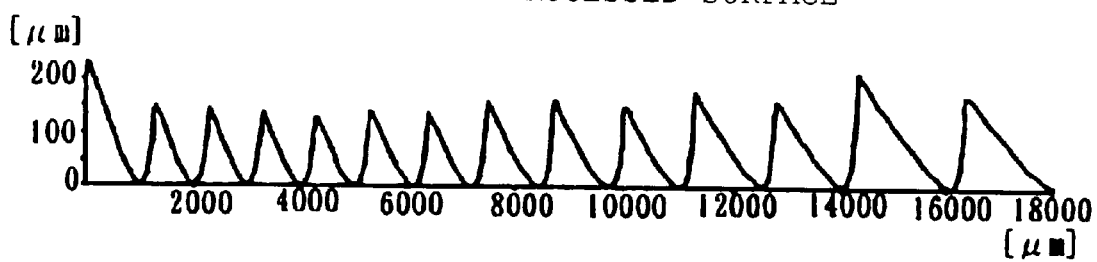
FIG. 11 is a profile of a surface processed according to the present invention.

After dressing, ELID grinding was carried out. Table 2 shows the grinding conditions, and FIGS. 10 and 11 show the roughness and shape of the processed surface, respectively. The depth of cutting was about 200 μm from the surface of the material being processed. Processing was carried out using a program with 3-second dwell time every 5 μm. The pitch was changed depending on the width of the groove after processing.

TABLE 2

| Grinding conditions | |
|---|---|
| Shaped of the grinding wheel [rpm] | 800 |
| Speed of the rotating table [rpm] | 500 |
| Feeding speed [mm/min] | 1 |
| Depth of cutting [μm] | 5 |
| Maximum current [A] | 10 |
| No-load voltage {V} | 30 |
| On/Off time [μs] | 2 |

Regarding the shape of a groove, sharp edges could be produced on the upper surface of the material. Hence, it was confirmed that when using the ELID grinding method, the grinding grains could always be used in the optimum sharpened condition, and fine ring-shaped protrusions (V-shaped grooves) could be formed accurately with a low processing force. The measured surface roughness was as excellent as Ra=0.24 μm and Ry=1.60 μm, thereby irregular reflections at the surface of the neutron lens could be suppressed and the transmission of the neutron beams could be increased. Even though the circumferential speed of cutting varied slightly between the inside and outside of the cut material 1 (neutron lens component), the measured surface roughnesses remained substantially constant, therefore, it was confirmed that an excellent mirror surface could be machined reliably even by using the tip of the grinding wheel (tapering surface 3a).

The widths of the cut grooves were slightly greater than expected because the material 1 was cut with small radii, therefore, the grooves were cut not only by the tip of the grinding wheel but also by the peripheral parts. However, according to the present invention, the angle of the tapering surface 3a of the grinding wheel is made more acute than the angle of the V-shaped groove cut in the surface of the neutron lens component 1, so by slightly oscillating the angle of inclination of the axis of the grinding wheel as it cuts the surface of the neutron lens component, V-shaped grooves with a freely selected angle larger than the angle made by the tapering surface 3a can be processed on the surface of the neutron lens component, using both sides of the tapering surface. Although the bottoms of the cut grooves became circular arcs in shape, this might be because of the initial shape and wear of the tip of the grinding wheel.

In addition, it can be expected to cut grooves to the preferred shape and accuracy by analyzing the relationship between the diameter of the grinding wheel and the grinding position, and using a grinding wheel with fine grains.

According to the present invention as described above, a basic experiment was carried out using the ELID method, as the processing method for forming the material for a neutron lens, and an attempt was made to grind a carbon disk by the ELID method in order to study the basic processing characteristics, and it was confirmed that grooves with the triangular shaped section shown in FIG. 11 could definitely be processed.

Thus, the apparatus and method for processing a neutron lens component according to the present invention provides superior advantages including the fact that fine ring-shaped protrusions can be formed accurately with an excellent surface finish and a low processing force on the surface of a neutron lens component such as graphite.

The present invention shall of course not be limited only to the above-mentioned embodiments, but as long as the scope of the present invention is not exceeded, various modifications can be implemented. For instance, although graphite was ground by ELID in the example mentioned above, another neutron lens material can also be processed.

What is claimed is:

1. A neutron lens component processing apparatus comprising:
    a rotating table that holds a flat neutron lens component comprised of a substance with a refractive index of less than 1 for a neutron beam;
    a circular-disk type of metal-bonded grinding wheel comprised of one tapering surface or a plurality of tapering surfaces on the outer periphery thereof;
    a grinding wheel driving device that drives the grinding wheel to rotate around the axis thereof and moves the grinding wheel relative to the rotating table;
    an electrode comprised of a surface close to the single tapering surface or plurality of tapering surfaces of the grinding wheel;
    a power source that applies an electrolytic voltage between the grinding wheel and the electrode, and a grinding fluid feeder that supplies a conducting grinding fluid between the grinding wheel and the electrode, wherein
    the angle made by the single tapering surface or plurality of tapering surfaces is formed with a more acute angle than the angle of a V-shaped groove formed on the surface of the neutron lens component, the grinding wheel driving device positions the axis of the grinding wheel at an oblique angle to the axis of rotation of the neutron lens component, and the oblique angle can be slightly varied at that position.

2. The neutron lens component processing apparatus specified in claim 1, wherein the metal-bonded grinding wheel comprises a cobalt-based bonded grinding wheel comprised of ultra-fine grinding grains with a mean grain radius of 10 $\mu$m or less.

3. A neutron lens component processing method wherein
    (A) a flat neutron lens component comprised of a substance with a refractive index of less than 1 for a neutron beam is attracted to and fixed on the surface of a rotating table and is rotated about an axis Z orthogonal to the component,
    (B) a circular-disk type of metal-bonded grinding wheel comprising on the outer periphery thereof a single tapering surface or a plurality of tapering surfaces formed with an angle more acute than the angle of a V-shaped groove to be formed on the surface of the neutron lens component, is driven and rotated around the axis thereof, and the grinding wheel is moved relative to the rotating table,
    (C) the single tapering surface or plurality of tapering surfaces are dressed electrolytically by supplying a conducting grinding fluid and applying an electrolytic voltage between an electrode comprised of a surface close to the single tapering surface or plurality of tapering surfaces, and
    (D) at the same time, the axis of the grinding wheel is positioned at an oblique angle to the axis of rotation of the neutron lens component, and at that position, the angle of obliquity is slightly varied, and a specified V-shaped groove is processed on the surface of the neutron lens component using both sides of the tapering surface.

* * * * *